United States Patent

Uzik

[11] Patent Number: 5,895,836
[45] Date of Patent: Apr. 20, 1999

[54] GREYSCALE CALIBRATION METHOD IN DIGITAL PRINTING

[76] Inventor: Barry K. Uzik, 366 Minstrel Ct., Old Bridge, N.J. 08857

[21] Appl. No.: 08/964,375

[22] Filed: Nov. 6, 1997

[51] Int. Cl.⁶ .................................................. G01N 21/00
[52] U.S. Cl. ............................ 73/1.01; 101/483; 356/243; 356/421
[58] Field of Search ........................ 73/1.01; 101/483; 356/243, 421

[56] References Cited

U.S. PATENT DOCUMENTS

| | | | |
|---|---|---|---|
| 3,832,070 | 8/1974 | Cox | 101/421 |
| 3,995,958 | 12/1976 | Pfahl et al. | 101/170 |
| 4,309,496 | 1/1982 | Miller | 101/211 |
| 4,553,478 | 11/1985 | Greiner et al. | 101/181 |
| 4,570,539 | 2/1986 | Rottstedt | 101/483 |
| 4,667,596 | 5/1987 | Dotzel et al. | 101/211 |
| 5,068,810 | 11/1991 | Ott | 101/211 |
| 5,209,162 | 5/1993 | Whitbey | 101/211 |
| 5,412,577 | 5/1995 | Sainio et al. | 101/181 |
| 5,805,280 | 9/1998 | Lasken et al. | 101/484 |

Primary Examiner—Hezron Williams
Assistant Examiner—Chad Soliz
Attorney, Agent, or Firm—Charles I. Brodsky

[57] ABSTRACT

The method of the invention allows adjustment of the Greyscale of a digital print in addition to adjusting the individual colors thereof, which have a tendency to vary as the respective inks are changed, the paper or canvas stocked utilized is replaced, or the printer drifts with time. In accordance with a preferred embodiment of the method, the densitometers employed in calibrating the printer are individually adjustable to vary the Greyscale, where needed, while continuing to tailor the component colors displayed. Rather than utilizing prior art methods of only calibrating the printer, the method of the invention additionally permits the adjustment of the calibrator in maintaining proper Greyscale.

7 Claims, No Drawings

GREYSCALE CALIBRATION METHOD IN DIGITAL PRINTING

FIELD OF THE INVENTION

This invention relates to the digital printing business and, more particularly, to the digital printing of signs, advertising, and artwork, whether on paper or on canvas.

BACKGROUND OF THE INVENTION

In the commercial digital printing business, the need for regularly calibrating the color printers employed is both known and accepted—not only when the ink supplies are replenished, or when different papers or canvases are to be printed on, but over various intervals of time as well, as the hole sizes of the ink cartridges wear with time getting larger through continuing use. Because the characteristics of the inks may change, or the light reflective characteristics of the papers or canvases may be different, or the amounts of color inks put down increase, the end result has been appreciated to be a color print different from those previously made on that printer, even where the computer generated signal continues to be exactly representative of the image originally scanned. For such reasons, it is not unusual to find the color printer manufacturer supplying along with such equipment a calibrating device in the form of a densitometer for color management. The intention of such cooperation is to analyze the colors reproduced, and to calibrate the printer if need be, usually at its Raster Image Processing Software of the on-board computer included in its construction.

A typical procedure in so calibrating the printer revolves around the standards as to how much of each of Cyan (C), Magenta (M), Yellow (Y) and Black (K) reference colors are in a printed strip. Thus, in this widely accepted procedure, the four colors CMYK are printed out typically in groups of five different shades for each color (or as few as one shade per color), and with the calibrator then reading each shade, for storage in the Raster Image Processing Software. With the calibrator also being employed to take a reading of the paper or canvas (termed the "White Point"), everything is stored and then later compared when the paper or canvas is changed, when the inks are changed, and over time because of printer drift.

While such arrangements have been accepted by those operating in the digital printing business with a single computer feeding a single printer, such arrangement has been determined to provide generally unsatisfactory results when that single computer feeds color corrected images to several printers over a network, as is the situation with a more elaborate digital printing business. More specifically, the printed images were observed to have various degrees of "tinting" when compared from one printer output to another. Whereas such differences might not be wholly objectionable to an owner of a print as to whether the sky was "bluer" than it should be, or that trees were "greener" than in the actual scene, the "tinting" becomes more objectionable if a pictured snow fall in that print turned out to have a "pinkish" or "yellowish" tinge. Where a typical run of one or more prints are to be made from a photograph, for example, these different tinges of "pink" or "yellow" not only would become objectionable, but would become more so from copies produced from one printer, as compared to another.

Review and analysis of the situation led to the realization that just calibrating the printer is not enough—that the problem additionally follows from the printer not being able to produce a good Grey scale. Whether the problem results from the operator being not quality conscious enough, or whether it arises from the lack of realization since the operator isn't called upon to print Black-White pictures, analysis revealed a need to allow for controlling the color Grey scale, as well as the characteristics of the CMYK colors themselves.

DESCRIPTION OF THE INVENTION

Further analysis showed that to control the Grey scale, it becomes necessary to adjust the calibrator—in essence calibrating the densitometer used to calibrate the printer. Rather than just employing, as did the prior art, a densitometer to "read" the colors and adjust the Raster Image Processing Software in the printer, a first adjustment is required of the various calibrator settings so as to allow a Grey scale correction. Thus, instead of employing a densitometer just to provide readings, the teachings of the present invention add that the densitometer, itself, has to be adjustable. At the same time, analysis indicated that the process to be employed would have to be one which could take place in as short a period of time as possible—as it conventionally took approximately one minute to print just one inch of a sign, an advertisement or an artwork—and constant and continuous calibrations would, of necessity, eat into the time available for printing, even if a number of printers were usable in a networking arrangement being driven by a single personal computer image.

In accordance with this, the present invention utilizes a Greyscale calibration method utilizing a densitometer with adjustable color settings, along with a reference card of corresponding individual dots serving as the reference colors. For the CMYK and White scheme, such reference standards to be used may be designated as: White (W)=0.00, C=1.32, M=1.44, Y=1.07, and K=1.71. With this set of conditions, the calibration method of the invention includes the following steps to maintain correct printer color and to minimize color drifting:

1. viewing a Greyscale on a computer—preferably using a 20 step Red-Green-Blue File;
2. calibrating the densitometer against the reference color dots, against W=0.00, C=1.32, M=1.44, Y=1.07 and K=1.71. Here, the densitometer can first be reset to zero with the densitometer then being placed over the paper or canvas employed to take a "White point" reading which is displayed for storing in the Raster Image Processing Software printer's computer. The process is then repeated for calibrating the densitometer, by placing it successively over each of the four reference color dots, and advancing the densitometer reading up or down by toggling or pressing its controls until the readings of 1.32 (C), 1.44 (M), 1.07 (Y), and 1.71 (K) are displayed;
3. printing out the calibration page—more particularly, the top color strip;
4. taking the densitometer measurements once again on the color strip printed, starting with the "White point" reading, and progressing through the measurements of the other Cyan, Magenta, Yellow and Black readings; and
5. saving the densitometer settings in the Raster Image Processing Software computer and printing out the Greyscale once again on the paper or canvas employed.

If the Greyscale is correct, nothing further need be done. If, on the other hand, the Greyscale is off-color, and not Grey, but some other color tinge, increasing or decreasing the toggle or button densitometer settings would be required, and in the following manner:

a. if the Greyscale is too RED, adjust the densitometer setting to decrease the RED, by increasing the Cyan;

b. if the Greyscale is too BLUE, adjust the densitometer settings to increase the Yellow;

c. if the Greyscale is too GREEN, then to decrease the GREEN, decrease the densitometer Magenta settings;

d. if the Greyscale is too Magenta, too Yellow, too Cyan, or too Black, then the appropriate densitometer settings can be adjusted by toggling or depressing its buttons to respectively decrease the Magenta, the Yellow, the Cyan or the Black.

In this manner, instead of adjusting the printer through the calibration process as typified the prior art, the method of the invention essentially adjusts the calibrating densitometer. As will be seen, if the Greyscale indicates a need to lower the Cyan color content, the densitometer is adjusted to increase the reference setting for Cyan above 1.32. Likewise, if the Greyscale reflects a need to increase the Yellow content, the densitometer reference setting is lowered for Yellow below 1.07.

Experimentation has shown, furthermore, that the adjustments in settings upwards or downwards could result in a washed-out picture, losing saturation, whereas not removing enough color results in over-saturation. As indicated, increasing the color necessitates entering a lower number for that particular reference color, while decreasing the color requires a higher number for that densitometer reference setting. Experimentation has shown that the proper set up and balance with respect to saturation and Greyscale requires about 2 or 3 attempts until a satisfactory color saturation and Greyscale content results. In this manner, the densitometer calibration and recalibration allows for the control of the color Greyscale, which was not possible or achievable with the prior art schemes of color printer calibration.

Further testing has shown that even without changing the color inks, and utilizing the same paper or canvas stock, the color correction and Greyscale calibration continues to be needed—because of the problem associated with the printer drifting. Once it is observed that the printer colors vary, or that the Greyscale shifts, all that becomes necessary with the invention is to adjust the densitometer settings to essentially recalibrate the calibrator in controlling the printer's Raster Image Processing Computer Software. With the method of the invention, approximately less than 30 minutes is all it takes at the start of each day to set up the printer and fine-tune it, if necessary, to maintain the Greyscale and color correction constant throughout the day. In this way, usage has shown it possible to generate upwards of 100 or more commercial prints of signs, advertisements or art-work, of a size that usually sells for $100.00–$300.00 each.

While there has been described what is considered to be a preferred embodiment of the method of the invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A method of Greyscale calibration in digital printing employing a densitometer comprising the steps of:

a. printing a Greyscale on paper or canvas stock;

b. calibrating the densitometer against a prescribed color standard;

c. printing a calibration page on said paper or canvas stock;

d. taking a series of densitometer measurements, including a White point reading of the stock utilized and the colors printed;

e. saving the densitometer measurements and printing the Greyscale again; and f. adjusting the Greyscale by recalibrating the densitometer to decrease a color or to increase a color as needed where the Greyscale is tinted.

2. The method of claim 1 wherein said last step increases the calibrated setting of the densitometer to decrease a color tint of the Greyscale.

3. The method of claim 1 wherein said last step decreases the calibrated setting of the densitometer to increase a color tint of the Greyscale.

4. The method of claim 1 wherein said second step calibrates the densitometer against prescribed color standards of White, Cyan, Magenta, Yellow and Black.

5. The method of claim 4 wherein said second step calibrates the densitometer against a prescribed color of White=0.00, Cyan=1.32, Magenta=1.44, Yellow=1.07, and Black=1.71.

6. The method of claim 1 wherein said last step maintains the calibrated setting of the densitometer in the presence of an acceptable Greyscale.

7. The method of claim 5 wherein said prescribed color standards are printed upon a reference card of "White" background selected to equal 0.00.

* * * * *